(12) United States Patent
Brioschi et al.

(10) Patent No.: US 11,009,049 B2
(45) Date of Patent: May 18, 2021

(54) HYDRAULIC OPERATING DEVICE FOR A CYCLE OR FOR A MOTORCYCLE COMPRISING A FLOAT VALVE

(71) Applicant: SUNSTAR ENGINEERING GmbH, Rain am Lech (DE)

(72) Inventors: Cesare Brioschi, Galbiate (IT); Davide Basso, Mariano Comense (IT)

(73) Assignee: SUNSTAR ENGINEERING GMBH., Rain Am Lech (DE)

( * ) Notice: Subject to any disclaimer, the term of this patent is extended or adjusted under 35 U.S.C. 154(b) by 0 days.

(21) Appl. No.: 16/536,405

(22) Filed: Aug. 9, 2019

(65) Prior Publication Data

US 2020/0049171 A1 Feb. 13, 2020

(30) Foreign Application Priority Data

Aug. 10, 2018 (IT) .................. 102018000008058

(51) Int. Cl.
*F15B 15/14* (2006.01)
*B62L 1/00* (2006.01)
*F16D 25/06* (2006.01)
*F16D 25/12* (2006.01)

(52) U.S. Cl.
CPC .......... *F15B 15/1404* (2013.01); *B62L 1/005* (2013.01); *F15B 15/149* (2013.01); *F15B 15/1414* (2013.01); *F16D 25/06* (2013.01); *F16D 25/12* (2013.01)

(58) Field of Classification Search
CPC ....... B60T 11/22; B60T 11/222; B60T 11/228
See application file for complete search history.

(56) References Cited

U.S. PATENT DOCUMENTS

| | | | |
|---|---|---|---|
| 2,112,356 A * | 3/1938 | Bock ..................... | B60T 11/228 60/586 |
| 3,474,710 A | 10/1969 | Stryker | |
| 3,643,551 A | 2/1972 | Berg | |
| 3,913,619 A | 10/1975 | Aulner | |
| 4,149,559 A * | 4/1979 | Wormser ............. | G05D 16/107 137/505.18 |
| 4,211,150 A | 7/1980 | Framberg | |
| 4,319,671 A * | 3/1982 | Smith .................... | F16D 65/74 188/153 R |
| 4,524,800 A * | 6/1985 | Holland ................. | B60T 11/30 137/516.27 |
| 4,802,559 A * | 2/1989 | Fourie .................. | B60T 13/583 188/153 R |
| 4,878,419 A | 11/1989 | Vick | |

(Continued)

FOREIGN PATENT DOCUMENTS

CN 201989779 U 9/2011
DE 666461 C * 10/1938 ............ B60T 11/228

(Continued)

*Primary Examiner* — Abiy Teka
*Assistant Examiner* — Matthew Wiblin
(74) *Attorney, Agent, or Firm* — Cantor Colburn LLP (57) ABSTRACT

A hydraulic operating device for a fluid of a cycle or of a motorcycle hydraulic system including a body, a first chamber carved in the body adapted to house an actuating piston, a second tank-chamber carved in the body and in fluid communication with said first chamber, a floating plug, a sphere, an elastic element, a rear sealing element and a rear plug.

15 Claims, 5 Drawing Sheets

(56) References Cited

U.S. PATENT DOCUMENTS

| | | | | |
|---|---|---|---|---|
| 4,949,590 A | * | 8/1990 | Barker | F16D 48/02 |
| | | | | 74/512 |
| 4,989,639 A | * | 2/1991 | Sulwer | F16K 15/044 |
| | | | | 137/614.17 |
| 5,507,218 A | | 4/1996 | Lipinski | |
| 6,014,862 A | * | 1/2000 | Shaw | B60T 7/042 |
| | | | | 60/533 |
| 6,367,255 B1 | * | 4/2002 | Gogo | B60T 11/22 |
| | | | | 60/588 |
| 6,550,872 B1 | * | 4/2003 | Caldwell | B60T 8/34 |
| | | | | 303/84.2 |
| 8,578,964 B2 | * | 11/2013 | Maszull | B60T 17/222 |
| | | | | 137/523 |
| 9,862,367 B2 | * | 1/2018 | Kang | B60T 11/16 |
| 2009/0152063 A1 | * | 6/2009 | Tsai | B60T 11/22 |
| | | | | 188/344 |
| 2015/0000265 A1 | | 1/2015 | Gohr | |

FOREIGN PATENT DOCUMENTS

| | | | | |
|---|---|---|---|---|
| DE | 670875 C | | 1/1939 | |
| DE | 740084 C | * | 10/1943 | B60T 11/228 |
| DE | 872455 U | | 4/1953 | |
| DE | 893449 C | * | 10/1953 | B60T 11/228 |
| DE | 102006060048 A1 | * | 8/2008 | B60T 11/16 |
| EP | 1435315 A1 | | 7/2004 | |
| FR | 906353 A | * | 1/1946 | B60T 11/228 |
| FR | 1009133 A | * | 5/1952 | B60T 11/228 |
| GB | 562073 A | | 6/1944 | |
| JP | 2005162126 | | 6/2005 | |

* cited by examiner

HYDRAULIC OPERATING DEVICE FOR A CYCLE OR FOR A MOTORCYCLE COMPRISING A FLOAT VALVE

CROSS REFERENCE TO RELATED APPLICATIONS

This application is related to and claims the benefit of Italian Patent Application Number 102018000008058 filed on Aug. 10, 2018, the contents of which are incorporated herein by reference in their entirety.

TECHNICAL FIELD

The present disclosure relates to a hydraulic operating device for a cycle or for a motorcycle comprising a float valve.

BACKGROUND

Hydraulic operating devices for hydraulic bicycle brakes or for a motorcycle clutch are known in the state of the art.

For example, a hydraulic braking system for a bicycle comprises a brake caliper and a hydraulic operating device for brakes that comprises a brake lever adapted to rotate about a pin, a piston that slides in a main cylinder of a cartridge in conformity with the rotation of the brake lever. When the piston slides, the fluid (oil, for example) is ejected from the main cylinder to control the brake caliper.

BRIEF SUMMARY

The disclosure is directed to a hydraulic operating device that is easy to fill with a hydraulic system fluid and is easy to clean, which allows detecting a quantity of fluid present in a tank-chamber.

BRIEF DESCRIPTION OF THE DRAWINGS

The features and advantages of the present disclosure will be more apparent from the following description, which is to be understood as exemplifying and not limiting, with reference to the appended schematic drawings, wherein.

DETAILED DESCRIPTION

With reference to the mentioned drawings, a hydraulic operating device 10 for a hydraulic system fluid of a cycle or of a motorcycle is shown; FIGS. 1 to 10 in particular show a hydraulic operating device 10 for a hydraulic system fluid for a bicycle brake. The hydraulic operating device 10 acts as actuator of brake calipers.

Figure 4:
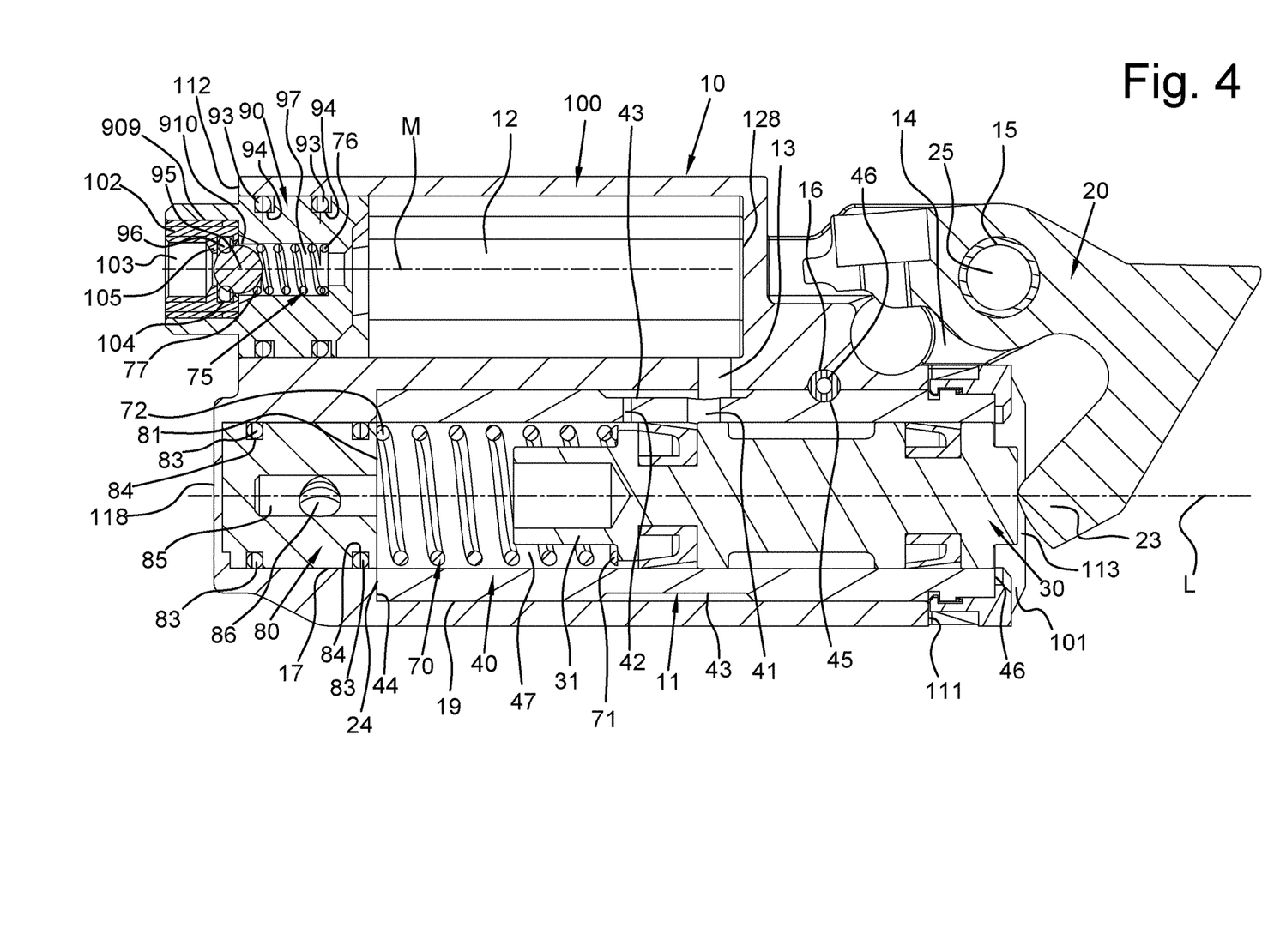
FIG. 4 is a section view according to the line IV-IV of FIG. 3.
Figure 5:
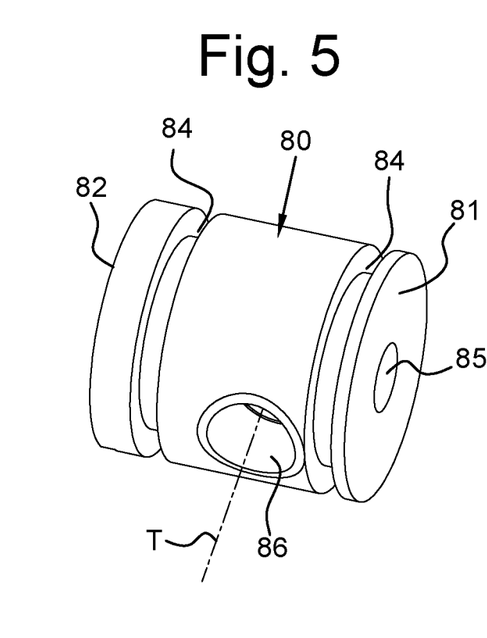
FIG. 5 is a perspective view of a float valve of the hydraulic operating device.
Figure 6:
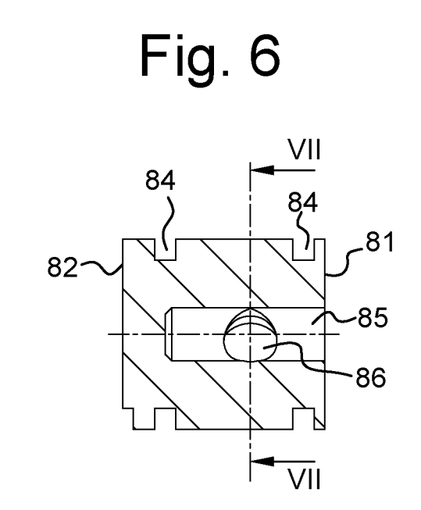
FIG. 6 shows a section view of the float valve of FIG. 5, according to the line IV-IV of FIG. 3.

As shown in particular in FIG. 4, the hydraulic operating device 10 comprises a first chamber 11 and a second chamber 12 which are in fluid communication by means of a first channel 13.

The first chamber 11 and the second chamber 12 are carved in a body 100 of the hydraulic operating device 10.

The first channel 13 is carved in the body 100 between the first 11 and the second chamber 12.

The first chamber 11 comprises a longitudinal dimension carved in the body 100 along a first longitudinal axis L.

The second chamber 12 comprises a longitudinal dimension carved in the body 100 along a second longitudinal axis M.

The first longitudinal axis L and the second longitudinal axis L are parallel to each other so as to advantageously reduce the dimensions of the hydraulic operating device 10.

The first chamber 11 is enclosed by walls of the body 100 that are cylindrical in shape.

As shown in particular in FIGS. 1 to 4, the first chamber 11 is closed at the back by means of a rear wall 118 of the body 100 and is open at the front by means of a front opening 111 of the body 100.

The front opening 111 has dimensions adapted for the insertion of other elements of the hydraulic operating device 10.

The second chamber 12 is enclosed by walls of the body 100.

The second chamber 12 is closed at the front by means of a front wall 128 of the body 100 and is open at the back by means of a rear opening 112 of the body 100. The rear opening 112 has dimensions adapted for the insertion of further other elements of the hydraulic operating device 10.

The second chamber 12 is a tank for the hydraulic system fluid.

The first channel 13 is carved in the body along a transverse direction which is perpendicular both to the first longitudinal axis L and to the second longitudinal axis M.

The body 100 of the hydraulic operating device 10 comprises two connectors 110 that are through openings that put the outside of the body 100 in fluid communication with the first chamber 11 and that are adapted to mount respective connectors 200 of the hydraulic system. The connectors 110 of the body 100 are adapted to make the hydraulic system fluid exiting from the first chamber 11 or entering the first chamber 11 pass through them.

Figure 3:
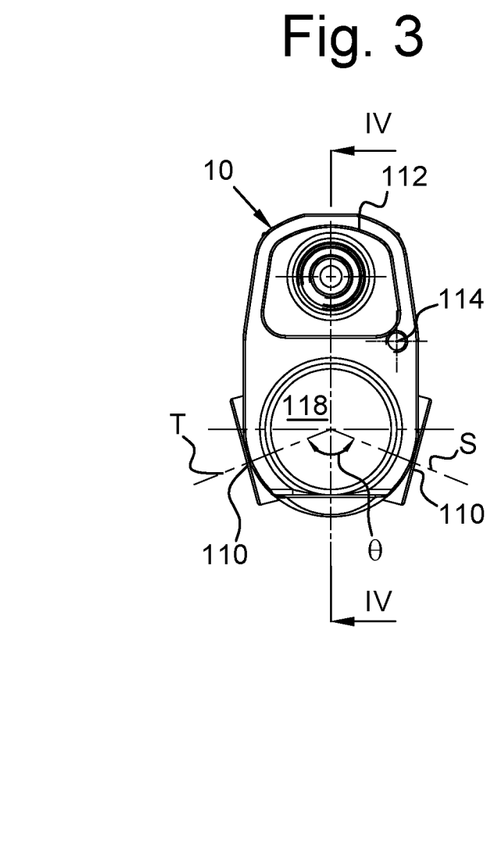
FIG. 3 is a rear view of the hydraulic operating device.

As shown in particular in FIG. 3, the two connectors 110 are carved in the body 100 along two different transverse directions arranged along two respective transverse axes S and T. The two transverse axes S and T are perpendicular to the first L and to the second M longitudinal axis L. The two transverse axes S and T lie on a transverse geometric plane perpendicular to the longitudinal axes L and M, wherein an angle θ is shown between a first transverse axis S and a second transverse axis T of the two transverse axes.

The angle θ between the first transverse axis S and the second transverse axis S is comprised between 0 and 360 sexagesimal degrees. The hydraulic operating device 10 may indeed provide different connectors 110 arranged at different angles θ with respect to the ones shown in particular in FIG. 3. For example, when the angle θ is of 0 sexagesimal degrees, then one connector 110 alone, arranged towards the bottom with respect to FIG. 3, is provided in place of the two connectors 110. For example, when the angle θ is of 360 sexagesimal degrees, then one connector 100 alone, arranged towards the top with respect to FIG. 3, is provided in place of the two connectors 110.

As shown in particular in FIGS. 1 to 4, the body 100 of the hydraulic operating device 10 comprises a slotted portion 14 comprising two through slots 15. The slotted portion 14 is arranged in the upper front part of the body 100 of the hydraulic operating device 10.

The hydraulic operating device 10 comprises a control lever 20 and a pin 25, wherein the control lever 20 is rotatably mounted by means of the pin 25 with the two through slots 15 of the slotted portion 14 of the body 100.

The hydraulic operating device 10 comprises the other elements of the hydraulic operating device 10 adapted to be inserted inside the first chamber 11. The other elements of the hydraulic operating device 10 are a distribution body 80 of the hydraulic system fluid, a cartridge 40, a first elastic element 70 and a piston 30.

The distribution body 80, the cartridge 40, the first elastic element 70 and the piston 30 are mounted inside the first chamber 11 of the hydraulic operating device 10 along the direction of the first longitudinal axis L, making them pass in sequence through the front through opening 111 of the body 100.

As shown in particular in FIG. 4, the first chamber 11 comprises a rear part 17 and a front part 19. The rear part 17 of the first chamber 11 has a smaller diameter with respect to the front part 19.

The rear part 17 of the first chamber 11 is adapted to allow the sealable insertion of the distribution body 80 until a rear wall 82 of the distribution body 80 is stopped in contact with the rear wall 118 of the body 100.

The second part 19 of the first chamber 11 is adapted to allow the insertion of the cartridge 40.

A step 24 is formed between the first part 17 and the second part 19 of the first chamber 11, which step is adapted to act as a stop for an open rear end in the rear through opening 44 of the cartridge 40.

The first part 17 of the first chamber 11 comprises the two connectors 110 for the hydraulic system fluid.

Figure 1:
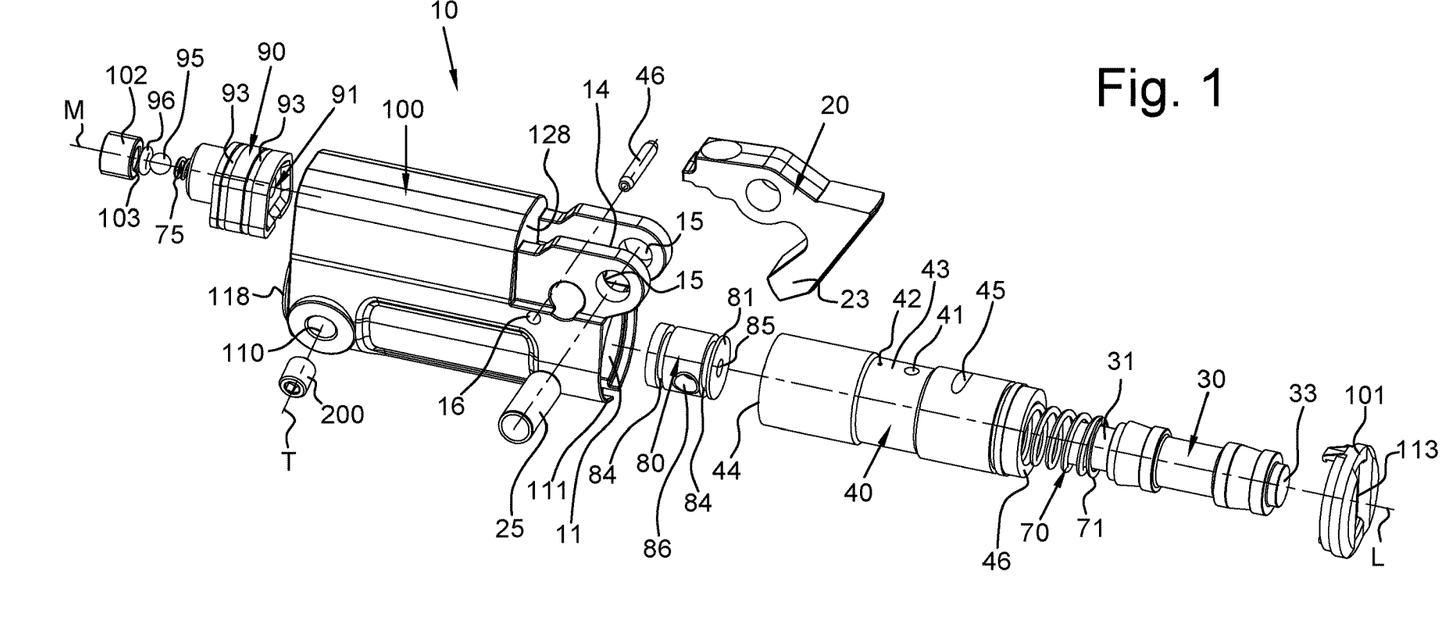
FIG. 1 is an exploded perspective view of a hydraulic operating device for a cycle or for a motorcycle according to the present disclosure.

As shown in particular in FIGS. 1, 4, the cartridge 40 is a hollow cylinder comprising a front through opening 46 and the rear through opening 44.

The cartridge 40 comprises an outer surface comprising a first groove 43 that decreases the outer diameter of the outer surface of the cartridge 40. A first through opening 41 and a second through opening 42 are carved in the body of the cartridge 40, starting from the first groove 43 up to reaching the inner surface of the cartridge 40.

The inner part of the hollow cartridge 40 identifies a cavity 47 of the cartridge 40.

The first groove 43 of the cartridge 40 is arranged at the first channel 13 of the body 100.

The first groove 43 of the cartridge 40 is in fluid communication with the first channel 13 of the body 100.

The first through opening 41 and the second through opening 42 are in fluid communication with the first channel 13 of the body 100 and are adapted to make the fluid pass between the first groove 43 and the inner surface of the cartridge 40.

The first through opening 41 and the second through opening 43 are carved in the body of the cartridge 40 along transverse axes that are perpendicular to the first longitudinal axis L.

Figure 2:
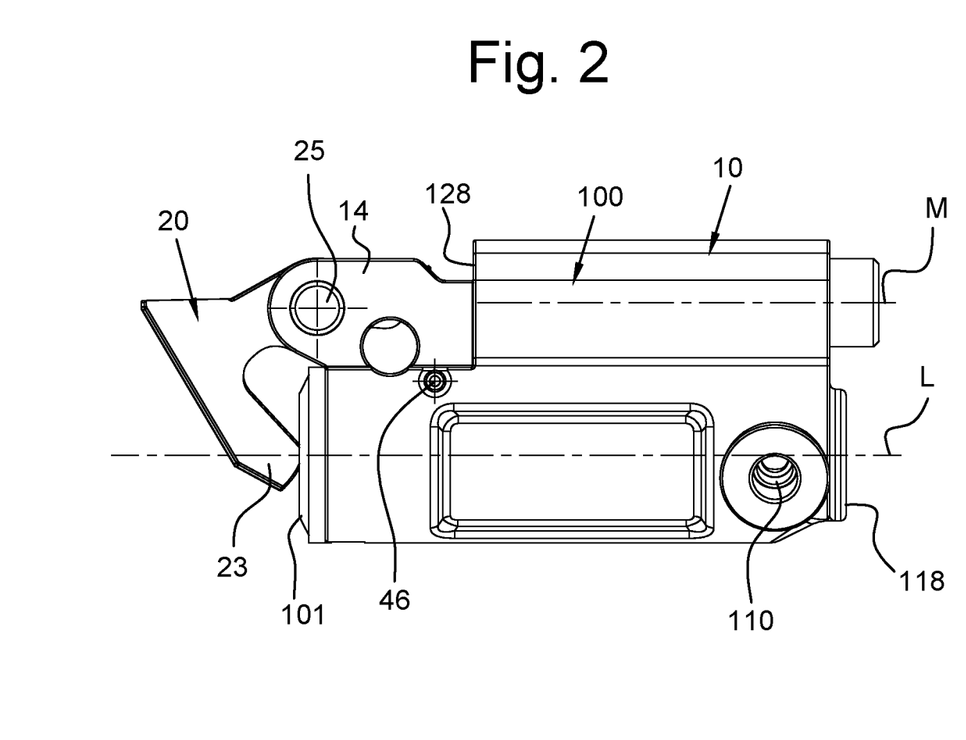
FIG. 2 is a side view of the hydraulic operating device.

As shown in particular in FIGS. 1, 2, 4, the hydraulic operating device 10 also comprises a stopping grub screw 46.

The cartridge 40 comprises a second groove 45 adapted to be engaged by the stopping grub screw 46 that engages in a through opening 16 in the body of the hydraulic operating device 10 to lock the cartridge 40 inside the first chamber 11, thus preventing it from sliding inside the front part 19 of the first chamber 11, therefore locking the cartridge 40 with the body 100.

The cavity 47 of the cartridge 40 is adapted to allow the sliding of the piston 30 and the compression and relaxation movement of the first elastic element 70.

The front through opening 46 of the cartridge 40 has suitable dimensions for the insertion of the first elastic element 70 and of the piston 30.

The control lever 20 comprises a pressing portion 23 that is adapted to switch from a multiplicity of positions during the rotation of the control lever 20 about the pin 25. The pressing portion 23 of the control lever 20 is adapted to push a front part 33 of the piston 30 of the hydraulic operating device 10 inside the front part 19 of the first chamber 11 along the direction of the first longitudinal axis L and towards the rear wall 118 of the body 100.

The piston 30 is slidably mounted with said cavity 47 of the cartridge 40 and is adapted to make the first elastic element 70 switch from at least one compressed position to at least one more compressed position. The piston 30 comprises the front part 33 facing towards the front opening 111 of the body 100 and a rear part comprising a stem 31 that mounts a front end 71 of the first elastic element 70.

A rear end 72 of the first elastic element 70 is mounted against a front wall 81 of the distribution body 80.

The first elastic element 70 is a helical spring. Other types of elastic elements may also be provided.

As shown in particular in FIGS. 1, 4 to 7, the distribution body 80 has the shape of a cylinder and is mounted inside the rear part 17 of the first chamber 11 of the hydraulic operating device 10 by means of two O-rings 83, and the rear wall 82 of the distribution body 80 is in contact with the rear wall 118 of the body 100.

The distribution body 80 comprises two seats 84 carved on its outer wall, wherein each of these two seats 84 is adapted to house one of the two O-rings 83, respectively. The seats 84 for the O-rings 83 are coaxial. Once the two O-rings 83 are mounted in the two respective seats 84 of the distribution body 80, the distribution body 80 is mounted with the rear part 17 of the first chamber 11 so that the two O-rings 83 interlock the distribution body 80 with the inner walls of the rear part 17 of the first chamber 11.

The distribution body 80 comprises an axial duct 85 carved inside the distribution body 80 along the first longitudinal axis L. The axial duct 85 is in fluid communication with the first chamber 11 and with the cavity 47 of the cartridge 40.

Figure 7:
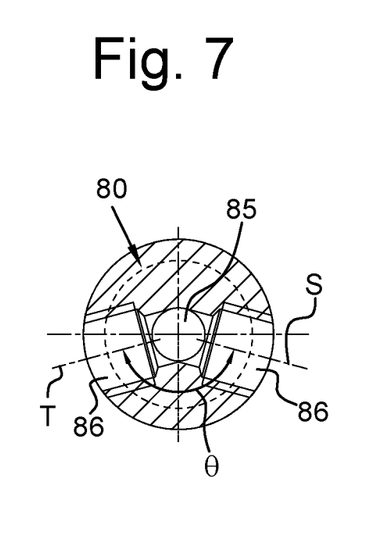
FIG. 7 shows a section view of the float valve according to the line VII-VII of FIG. 6.
Figure 8:
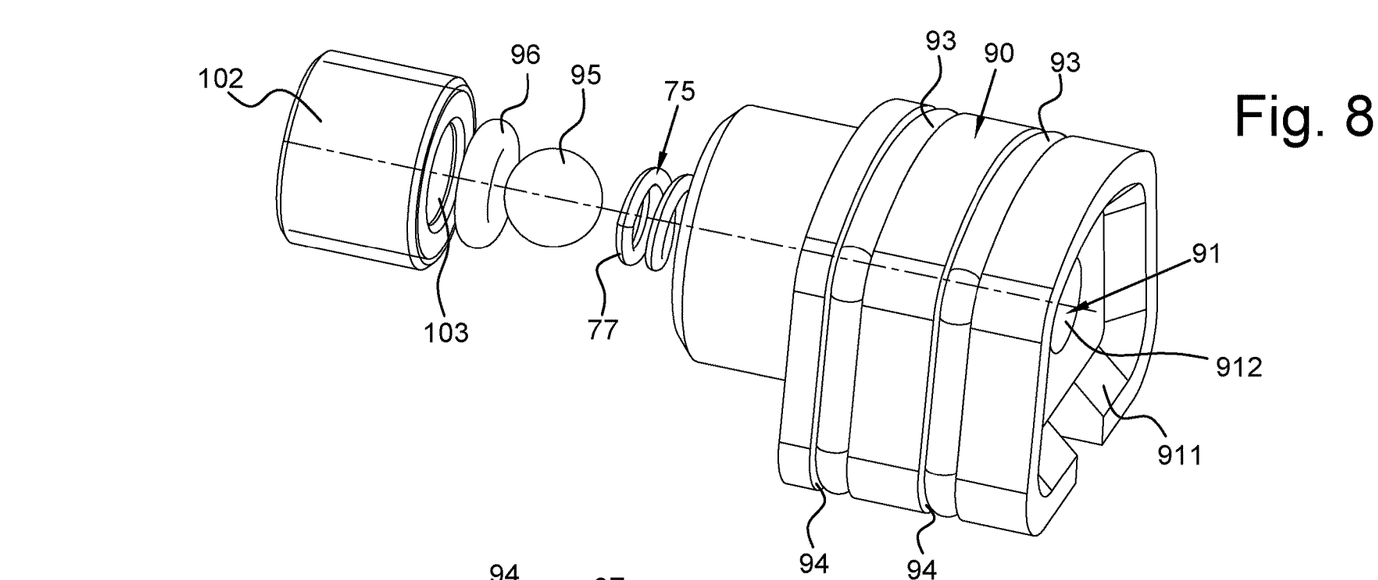
FIG. 8 shows a perspective view of a distribution body of hydraulic fluid of the hydraulic operating device.

The distribution body 80 comprises two transverse ducts 86 arranged along the transverse axes S and T, as shown in particular in FIG. 7, wherein also the angle θ is shown. The transverse ducts 86 of the distribution body are arranged along the same first S and second T transverse axes of the connectors 110 of the body 100 of the hydraulic operating device 10.

The transverse ducts 86 are in fluid communication with the axial duct 85 and with the two respective connectors 110.

Advantageously, the distribution body 80 is not made in one piece with the cartridge 40 so that should the angle θ of the connectors 110 of the hydraulic operating device 10 changes, it is sufficient to replace only the distribution body 80 that has transverse ducts 86 arranged according to the same angle θ as the connectors 110, it not being necessary to replace the cartridge 40, which is universal.

As shown in particular in FIGS. 1 and 4, a front plug 101 engages with the front opening 111 of the first chamber 11 so as to keep inside the hydraulic system fluid and the other elements of the hydraulic device 80, 70, 30, 40.

In particular as shown in FIG. 4, the cartridge 40 provides engaging elements for the front plug 101.

The front plug 101 comprises a through opening 113 adapted for the front part 33 of the piston 30 to pass through it to be pushed by the pressing portion 23 of the control lever 20.

As shown in particular in FIGS. 1, 8 to 10, the hydraulic operating device 10 comprises a floating plug 90 which is slidably mounted inside the second chamber 12 of the hydraulic operating device 10 by means of two interlocking O-rings 93. The floating plug 90 is mounted inside the second chamber 12, making it pass through the rear opening 112.

The further other elements of the hydraulic operating device 10 adapted to be inserted into the rear opening 112 of the second chamber 12 of the body 100 of the hydraulic operating device 10 are the floating plug 90, two interlocking O-rings 93, a sphere 95, a second elastic element 75, a rear O-ring 96 and a rear plug 102.

The floating plug 90 comprises two seats 94 carved on its outer wall, wherein each of these two seats 94 is adapted to house one of the two interlocking O-rings 93, respectively. The seats 94 for the interlocking O-rings 93 are coaxial. Once the two interlocking O-rings 93 are mounted in the two respective seats 94 of the floating plug 90, the floating plug 90 is slidably mounted with the inner walls of the second chamber 12 so that the two interlocking O-rings 93 interlock the floating plug 90 with the inner walls of the second chamber 12.

The two seats 94 for the respective two interlocking O-rings 93 are a front seat 94 arranged respectively on a front part of the outer wall of the floating plug 90 and a rear seat 94 arranged respectively on a rear part of the outer wall of the floating plug 90, so that the floating plug 90 may slide inside the second chamber 12, keeping stopped the sliding axis, which is the second longitudinal axis M.

The floating plug 90 comprises an axial through duct 91 carved inside the body of the floating plug 90 along the second longitudinal axis M. The axial through duct 91 is in fluid communication with the second chamber 12 and with the first channel 13 of the body 100 of the hydraulic operating device 10, and is in communication with the outside of the hydraulic operating device 10.

Figure 9:
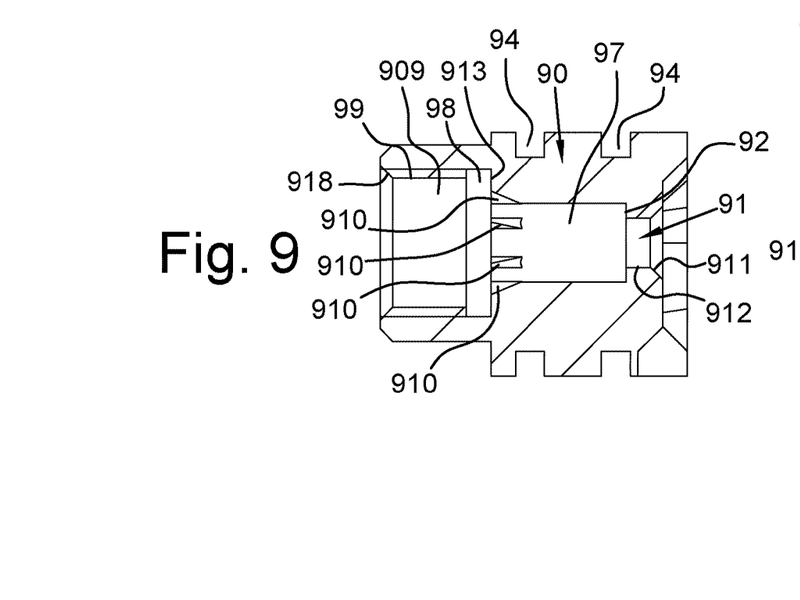
FIG. 9 shows a section view of the distribution body of FIG. 8, according to the line IV-IV of FIG. 3.

The axial duct 91 comprises a cylindrical central part 912 that widens forwards forming a front part 911, wherein this front part 911 gradually widens its inner dimension to be better adapted to the inner dimensions and to the shape of the second chamber 12. The front part 911 of the axial duct 91 is in fluid communication with the second chamber 12.

The rear verse of the central part 912 is in fluid communication with a part with an increased diameter 97 of the axial duct 91, wherein this part with an increased diameter 97 is adapted to provide a holding step 92 between the lower diameter of the central part 912 of the axial duct 91 and the part with an increased diameter 97. Such holding step 92 is adapted to serve as stop at a front end 76 of the second elastic element 75 of the floating plug 90. A rear end 77 of the second elastic element 75 is mounted with the sphere 95 of the floating plug 90.

The sphere 95 is mounted in roto-translation with the axial duct 91. The part with an increased diameter 97 of the axial duct 91 has a diameter adapted to allow the rolling and/or the sliding of the sphere 95 inside it. The part with an increased diameter 97 of the axial duct 91 of the floating plug 90 is a housing for the sphere 95.

The floating plug 90 comprises a rear opening 918 from which the second elastic element 75, the sphere 95, the rear O-ring 96 and the rear plug 102 can be inserted.

The part with an increased diameter 97 of the axial duct 91 comprises a rear part that comprises six radial channels 910 arranged along radial directions that start from the center of the axial duct 91 wherein there is the second longitudinal axis M, outwards of the floating plug 90. Such radial channels 910 gradually widen their cross section to directions parallel to the second longitudinal axis M.

In particular as shown in FIG. 9, each radial channel 910 of the six radial channels 910 gradually widens a cross section of the radial channel 910 in a linear way and a longitudinal section of the radial channel 910 has a triangular shape.

Figure 10:
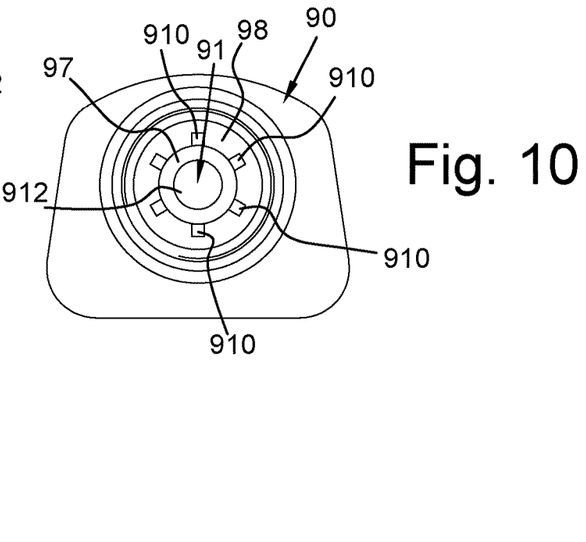
FIG. 10 shows a rear view of the distribution body.

As shown instead in FIG. 10, the cross section of the radial channels 910 has a geometric quadrangular shape.

As shown in particular in FIG. 9, the part with an increased diameter 97 of the axial through duct 91 further widens with a second step 913 in a rear part 909 of the axial through duct 91, wherein the rear part 909 has a greater diameter than the part with an increased diameter 97 of the axial through duct 91.

The rear part 909 of the axial through duct 91 comprises a front part 98 and a rear part 99 that comprise inner threaded walls which is the seat of the rear plug 102 that comprises outer threaded walls adapted to be screwed with the inner walls of the rear part 99 of the rear part 909 of the axial through duct 91.

As shown in particular in FIG. 4, the rear plug 102 is a hollow cylinder comprising a rear through opening 103. The rear through opening 103 is carved inside the body of the rear plug 102 along the second longitudinal axis M. Inner walls of the rear plug 102 comprise a seat 104 for the rear O-ring 96 adapted to lock the sphere 95 between the rear plug 102 and the part with an increased diameter 97 of the axial through duct 91 of the floating plug 90. Inner walls of the rear plug 102 comprise an inner wall 105 that reduces the inner diameter of the rear through opening 103 of the rear plug 102.

The rear plug 102 is mounted with said axial through duct 91 and is adapted to retain the sphere 95 inside the axial through duct 91. In particular, the inner wall 105 prevents the sphere 95 from coming out through the rear through opening 103 of the rear plug 102, retaining the sphere 96 inside the axial through duct 91.

The rear O-ring 96 is mounted with the sphere 95 and is pressed by the sphere 95 which in turn is pressed by the second elastic element 75 against the inner wall 105 of the rear plug 102, serving as sealing gasket to avoid the fluid of the second chamber 12 from exiting outwards.

The sphere 95 is adapted to make the second elastic element 75 switch from at least a compressed position to at least a more compressed position, wherein the compressed position of the second elastic element 75 provides for the sphere 95 to push the rear O-ring 96 to lock the fluid from coming out of the axial through duct 91, while the more compressed position of the second elastic element 75 allows the sphere 95 to roto-translate and allows the fluid to come out of the axial through duct 91.

Concerning the operation of the hydraulic operating device 10, the control lever 20 rotates about the pin 25 and the pressing portion 23 pushes the front part 33 of the piston 30 towards the inside of the first chamber 11, making the piston 30 slide inside the inner walls of the cartridge 40 in conformity with the rotation of the control lever 20. When the piston 30 slides, the hydraulic system fluid is ejected from the first chamber 11 through the axial duct 85 of the distribution body 80, passing through the two transverse ducts 86 of the distribution body 80 towards the hydraulic system to control the brake caliper.

When the control lever 20 does not push on the front part 33 of the piston 30, the piston 30 is pushed into the initial position by the first elastic element 70 and the hydraulic system fluid goes back into the first chamber 11 or arrives from the second chamber 12 by means of the first channel 13.

Concerning a filling or cleaning of fluid, a grub screw (not shown in the figures) pushes the sphere 95, compressing the second elastic element 75 until the rear through opening 103 is in fluid communication with the axial duct 91 to clean the fluid present in the second chamber 12 or to fill the second chamber 12 with the fluid from the rear through opening 103. When the grub screw stops compressing the sphere 95, it is pushed into the initial position against the inner wall 105 of the rear plug 102 by the elastic force of the second elastic element 75 of the floating plug 90, keeping the second chamber 12 closed.

Concerning a verification of the level of fluid present in the second chamber 12, the floating plug 90 is adapted to slide inside the second chamber 12 so as to keep the floating plug 90 under pressure against the fluid present inside the second chamber 12 also when the quantity of fluid, and therefore the volume of fluid of the second chamber 12 decreases following the use of the hydraulic operating device 10, and more generally, of the hydraulic system of the cycle or motorcycle brake or of the clutch of the motorcycle. Measuring the position of the floating plug 90 with respect to the body 100 of the hydraulic operating device 10, it is possible to establish the level of fluid present in the second chamber 12. The floating plug 90 adheres with the inner wall of the second chamber 12 and being slidably mounted with this inner wall of the second chamber 12 by means of the O-rings 93, it may translate along the second longitudinal axis M, dragged by the changes of volume of the fluid inside the second chamber 12 caused by the introduction of the fluid.

Alternatively, there is also provided a grub screw 114, shown in FIG. 3, adapted to make the floating plug 90 slide towards the front or towards the back of the second chamber 12.

Alternatively, it is possible to provide for the hydraulic operating device 10 to be for a hydraulic system fluid of a clutch of a motorcycle.

Alternatively, the cartridge 40 is made in one piece with the body of the hydraulic operating device 10. Advantageously, this alternative provides for the cartridge 40 not to be required, rather for it to have a different spatial arrangement of the connectors 110 in the presence of a different hydraulic operating device 10, which is sufficient to replace the distribution body 80 alone with another one comprising transverse ducts 86 reproducing the spatial arrangement of the connectors 110 of the hydraulic operating device 10.

Alternatively, it is possible to provide for the connectors 110 not to lie on the same geometric plane, rather to be arranged according to any spatial distribution. In such alternative, it is sufficient to replace the distribution body 80 alone with one that comprises transverse ducts 86 that reproduce the different spatial arrangement of the connectors 110 of the hydraulic operating device 10.

Alternatively, it is possible for sealing elements 83, 93, 96 to be provided in place of the O-rings 83, 93, 96.

The disclosure thus conceived is susceptible to many modifications and variants, all falling within the same inventive concept; furthermore, all details can be replaced by equivalent technical elements. In practice, the materials used, as well as the dimensions thereof, can be of any type according to the technical requirements.

The invention claimed is:

1. A hydraulic operating device for a fluid of a cycle or of a motorcycle hydraulic system comprising a body, a first chamber carved in the body adapted for housing an actuating piston, a second tank-chamber carved in the body and in fluid communication with said first chamber, a floating plug, a sphere, an elastic element, a rear sealing element and a rear plug, said second chamber is adapted for housing said floating plug,
said second chamber is enclosed by the body walls and opens outwards through a rear opening of the body,
said rear opening of the body has dimensions adapted for the insertion of said floating plug,
said floating plug is slidably mounted inside the second chamber,
said floating plug comprises an axial through duct in fluid communication with the second chamber,
said sphere is mounted in rototranslating way inside the axial through duct,
said rear plug comprises a rear through opening in fluid communication with the axial duct and with the outside,
said rear plug is mounted within said axial through duct,
said elastic element is mounted inside said axial through duct,
said rear sealing element is mounted with the sphere,
said sphere is adapted to make said elastic element pass from at least one compressed position to at least a more compressed position,
wherein the compressed position of the elastic element provides that the sphere pushes said rear sealing element to stop the fluid from coming out the axial through duct, wherein the more compressed position of the elastic element allows the sphere to roto-translate allowing the fluid to come out the axial through duct,
wherein said axial through duct of the floating plug comprises a part with an increased diameter, wherein said part with the increased diameter houses said sphere, wherein the part with the increased diameter of the axial through duct widens with a second step into a rear part of the axial through duct, wherein the diameter of said rear part is greater than that of the part with the increased diameter of the axial through duct, wherein said rear part of the axial through duct comprises inner threaded walls serving as a seat of the rear plug that comprises outer threaded walls adapted to be screwed onto said inner walls of the rear part of the axial through duct.

2. Hydraulic operating device according to claim 1, wherein hydraulic operating device comprises at least one interlocking sealing element, wherein said floating plug comprises at least one seat carved on its outer wall and adapted for housing the at least one interlocking sealing element of the hydraulic operating device, said at least one sealing element being mounted with said at least one seat of the floating plug.

3. Hydraulic operating device according to claim 2, wherein said floating plug comprises two seats of said at least one seat that are respectively mounted with two interlocking sealing elements of said at least one interlocking sealing element.

4. Hydraulic operating device according to claim 1, wherein the compressed position of the elastic element requires the sphere to push said rear sealing element against said rear plug.

5. Hydraulic operating device according to claim 1, wherein said rear plug is mounted with said axial through duct and is adapted for retaining the sphere inside the axial through duct.

6. Hydraulic operating device according to claim 5, wherein an inner wall of the rear through opening of the rear plug comprises an inner wall that reduces the inner diameter of the rear through opening of the rear plug, retaining the sphere inside the axial through duct.

7. Hydraulic operating device according to claim 6, wherein the compressed position of the elastic element requires the sphere to push said rear sealing element against said inner wall of said rear plug.

8. Hydraulic operating device according to claim 1, wherein the inner walls of the rear plug comprise a seat where said rear sealing element is mounted, locking the sphere inside the axial through duct of the floating plug.

9. Hydraulic operating device according to claim 1, wherein said floating plug comprises a rear opening of dimensions adapted for allowing the insertion of the elastic element, the sphere, the rear sealing element and the rear plug.

10. Hydraulic operating device according to claim 1, wherein said axial through duct of the floating plug comprises a cylindrical central part that comprises a front part, wherein said front part gradually widens its shape matching inner dimensions and a shape of the second chamber, wherein said front part of the axial through duct is in fluid communication with the second chamber.

11. Hydraulic operating device according to claim 1, wherein the part with the increased diameter of the axial through duct comprises a rear part with a plurality of radial channels arranged following radial directions that stretch from the center of the axial through duct towards an outer part of the floating plug gradually widening their cross section.

12. Hydraulic operating device according to claim 1, wherein each radial channel of a plurality of radial channels gradually widens a cross section of the radial channel in a linear way and a longitudinal section of the radial channel has a triangular shape.

13. Hydraulic operating device according to claim 1, wherein a central part of the axial through duct is in fluid communication with said part with the increased diameter of the axial through duct, wherein this part with the increased diameter provides a holding step between a lower diameter of the central part of the axial through duct and the part with the increased diameter of the axial through duct, wherein said holding step is adapted to be used as a stop for a front end of the elastic element and a rear end of the elastic element is mounted with the sphere.

14. Hydraulic operating device according to claim 1, wherein said second chamber comprises a longitudinal dimension carved in the body along a second longitudinal axis and in that said axial through duct of said floating plug is carved inside the body of the floating plug along said second longitudinal axis and in that said rear through opening of the rear plug is carved inside the body of the rear plug along said second longitudinal axis.

15. Hydraulic operating device according to claim 14, wherein said first chamber comprises a longitudinal dimension carved in the body along a first longitudinal axis and in that said first longitudinal axis is parallel to said second longitudinal axis.

\* \* \* \* \*